United States Patent
Dvir

(10) Patent No.: US 8,805,183 B2
(45) Date of Patent: Aug. 12, 2014

(54) OPTICAL LINE TERMINAL (OLT) AND METHOD THEREFORE FOR PERFORMING IN-BAND AND OUT-BAND OTDR MEASUREMENTS

(75) Inventor: Amiad Dvir, Nes-Ziona (IL)

(73) Assignee: Broadcom Corporation, Irvine, CA (US)

( * ) Notice: Subject to any disclaimer, the term of this patent is extended or adjusted under 35 U.S.C. 154(b) by 117 days.

(21) Appl. No.: 13/478,970

(22) Filed: May 23, 2012

(65) Prior Publication Data

US 2013/0202290 A1    Aug. 8, 2013

Related U.S. Application Data

(63) Continuation-in-part of application No. 13/368,887, filed on Feb. 8, 2012.

(51) Int. Cl.
  *H04B 10/08*   (2006.01)
  *H04B 17/00*   (2006.01)

(52) U.S. Cl.
  USPC .................................. 398/10; 398/16; 398/21

(58) Field of Classification Search
  USPC ......................................... 398/58, 66, 70–72
  See application file for complete search history.

(56) References Cited

U.S. PATENT DOCUMENTS

| | | | |
|---|---|---|---|
| 6,980,287 B2 | 12/2005 | Renard et al. | |
| 7,167,237 B2 | 1/2007 | Shimizu et al. | |
| 7,428,382 B2 | 9/2008 | Soto et al. | |
| 7,573,897 B2 | 8/2009 | Elmoalem et al. | |
| 7,643,753 B2 | 1/2010 | Weitz et al. | |
| 7,715,718 B2 | 5/2010 | Smith et al. | |
| 2004/0196664 A1 | 10/2004 | Renard et al. | |
| 2007/0116465 A1 | 5/2007 | Bieker | |
| 2007/0122157 A1 | 5/2007 | Vandewege et al. | |

(Continued)

FOREIGN PATENT DOCUMENTS

| | | |
|---|---|---|
| EP | 2 383 908 A1 | 11/2011 |
| WO | WO 2004/079404 A3 | 9/2004 |
| WO | WO 2011/007298 A1 | 1/2011 |

OTHER PUBLICATIONS

European Search Report for EP Patent Application No. EP13000379.1, European Patent Office, Munich, Germany, mailed on Jun. 13, 2013.

(Continued)

*Primary Examiner* — David Payne
*Assistant Examiner* — Casey Kretzer
(74) *Attorney, Agent, or Firm* — Sterne, Kessler, Goldstein & Fox P.L.L.C.

(57) ABSTRACT

An OLT operable in a PON and structured to perform OTDR measurements. The OLT comprises an electrical module for generating continuous downstream signals and processing received upstream burst signals according to a communication protocol of the PON; an optical module for transmitting continuous optical signals over a first wavelength, receiving optical upstream burst signals over a second wavelength, and transmitting optical upstream burst signals over a third wavelength, wherein the optical module further includes an ONU traffic processing module being electrically coupled to the optical module and the electrical module, wherein the ONU traffic processing module is configured to emulate one of a plurality of ONUs of the PON, to generate an analysis pattern to be transmitted as an optical upstream burst signal over a third wavelength, and analyze an analysis pattern received in an optical upstream burst signal for the purpose of performing the OTDR measurements.

22 Claims, 10 Drawing Sheets

(56) References Cited

U.S. PATENT DOCUMENTS

| | | |
|---|---|---|
| 2007/0153823 A1 | 7/2007 | Wojtowicz |
| 2008/0008212 A1 | 1/2008 | Wang et al. |
| 2008/0031624 A1 | 2/2008 | Smith et al. |
| 2009/0060496 A1 | 3/2009 | Liu et al. |
| 2009/0060507 A1 | 3/2009 | Effenberger et al. |
| 2009/0115999 A1 | 5/2009 | Watte et al. |
| 2009/0268197 A1 | 10/2009 | Perron et al. |
| 2010/0098413 A1 | 4/2010 | Li et al. |
| 2010/0166419 A1 | 7/2010 | Elmoalem et al. |
| 2010/0278533 A1 | 11/2010 | Julien et al. |
| 2011/0013904 A1 | 1/2011 | Khermosh et al. |
| 2011/0102776 A1 | 5/2011 | Hasegawa et al. |
| 2011/0116799 A1 | 5/2011 | Effenberger |
| 2011/0150475 A1 | 6/2011 | Soto et al. |
| 2011/0170858 A1 | 7/2011 | Aguren |
| 2011/0182588 A1 | 7/2011 | Wojtowicz |
| 2011/0211827 A1 | 9/2011 | Soto et al. |
| 2011/0274426 A1* | 11/2011 | Yang ............................ 398/16 |
| 2011/0280568 A1 | 11/2011 | Dvir et al. |
| 2011/0318002 A1 | 12/2011 | Sitton et al. |
| 2012/0020672 A1* | 1/2012 | Aguren ......................... 398/139 |
| 2012/0045205 A1 | 2/2012 | Perron |
| 2012/0051701 A1* | 3/2012 | Sicari et al. .................. 385/100 |
| 2012/0183289 A1* | 7/2012 | Lou et al. ......................... 398/9 |
| 2013/0202300 A1 | 8/2013 | Dvir et al. |

OTHER PUBLICATIONS

Communication from the Examining Division of the European Patent Office directed to related European Patent Application No. 13 000 379, Munich, Germany, mailed Jun. 26, 2013; 8 pages.

Notice of Allowance for U.S. Appl. No. 13/368,887, mailed Jan. 15, 2014; 7 pages.

Non-Final Office Action for U.S. Appl. No. 13/368,887, mailed Sep. 24, 2013, 28 pages.

Non-Final Office Action for U.S. Appl. No. 13/368,887, mailed May 14, 2013; 32 pages.

Non-Final Office Action for U.S. Appl. No. 13/368,887, mailed Apr. 14, 2014; 15 pages.

* cited by examiner

OPTICAL LINE TERMINAL (OLT) AND METHOD THEREFORE FOR PERFORMING IN-BAND AND OUT-BAND OTDR MEASUREMENTS

CROSS REFERENCE TO RELATED APPLICATIONS

This application is a continuation-in-part of U.S. patent application Ser. No. 13/368,887 filed on Feb. 8, 2012, the contents of which are herein incorporated by reference.

TECHNICAL FIELD

The present invention relates generally to passive optical networks (PONs), and more particularly to an architecture of an optical network unit (ONU) integrated in an optical module of an optical line terminal (OLT) adapted to perform optical time-domain reflectometer (OTDR) measurements.

BACKGROUND OF THE INVENTION

A passive optical network (PON) comprises an optical line terminal (OLT) connected to multiple optical network units (ONUs) in a point-to-multi-point network. New standards have been developed to define different types of PONs, each of which serves a different purpose. For example, the various PON types known in the related art include a Broadband PON (BPON), an Ethernet PON (EPON), ten Gigabit-Ethernet PON (10G-EPON) a Gigabit PON (GPON), ten-Gigabit PON (XG-PON), and others.

An exemplary diagram of a typical PON 100 is schematically shown in FIG. 1. The PON 100 includes N ONUs 120-1 through 120-N (collectively referred to as ONUs 120) connected to an OLT 130 via a passive optical splitter 140 and the optical fiber. In a GPON, for example, traffic data transmission is achieved using a GPON encapsulation method (GEM) over two optical wavelengths, one for the downstream direction and another for the upstream direction. Thus, downstream transmission from the OLT 130 is broadcast to all the ONUs 120. Each ONU 120 filters its respective data according to pre-assigned labels (e.g., GEM port-IDs in a GPON). The splitter 140 is 1 to N splitter, i.e., capable of distributing traffic between a single OLT 130 and N ONUs 120.

In most PON architectures, the upstream transmission is shared between the ONUs 120 in a TDMA based access, controlled by the OLT 130. TDMA requires that the OLT 130 first discovers the ONUs and measures their round-trip-time (RTT), before enabling coordinated access to the upstream link. With this aim, the OLT 130, during a ranging state, tries to determine the range between the terminal units (i.e., ONUs 120) to find out at least the RTT between OLT 130 and each of the ONUs 120. The RTT of each ONU 120 is necessary in order to coordinate a TDMA based access of all ONUs 120 to the shared upstream link. During a normal operation mode, the range between the OLT 130 to the ONUs 120 may change over time due to temperature changes on the fiber links (which results with varying signal propagation time on the fiber). Thus, the OLT 130 continuously measures the RTT and adjusts the TDMA scheme for each ONU accordingly.

As schematically shown in FIG. 2, an OLT 200 operable, for example, in a GPON or XG-PON includes an electrical module 210 and an optical module 220. The electrical module 210 is responsible for the processing of received upstream burst signals and generating downstream signals. The electrical module 210 typically includes a network processor and a media access control (MAC) adapter designed to process and handle upstream and downstream signals according to a respective PON standard.

The optical module 220 in most cases is implemented as a small form-factor pluggable (SFP) transceiver that receives optical burst signals sent from ONUs and transmits continuous optical signals to ONUs. The reception and transmission of signals is over two different wave lengths. For example, in a GPON, in the downstream direction, the optical module 220 generates an optical signal of 1480 nm to 1500 nm (as referred to 15XY) and in the upstream direction receives optical signals between 1260 nm and 1360 nm (also referred to as 13XY in GPON).

The optical module 220 includes a laser driver diode 221 coupled to a transmit laser diode that produces optical signals based on the electrical signals provided by the laser diode driver 221. The module 220 also includes a limiter amplifier 222 coupled to a receive photodiode that produces current in proportion to the amount of light of the optical input burst signal. The limiter amplifier 222 generates two current levels indicating if a received burst signal is '1' or '0' logic value.

The receiver/transmitter optical elements (i.e., a photo-diode and laser diode) are realized as a bidirectional optical sub-assembly (BoSa) module 223 that can transmit and receive high rate optical signals. The optical module 220 also includes a controller 224 that communicates with the electrical module 210 through the I2C interface and performs tasks related to calibration and monitoring of the transceiver.

Vendors of the OLTs typically develop and fabricate the electrical module 210 of the OLT, where the optical module 220 is often an off-the-shelf transceiver, such as SFP, XFP and the like. Thus, the interface between the electrical module 210 and the optical module 220 is a standard interface being compatible with any type of SFP transceiver. As illustrated in FIG. 2, the interface includes wires for receive (RX) data, transmit (TX) data, TX-enabled signal, RX-Reset signal, and I2C for interfacing between the electrical module 210 and the controller 224. The I2C interface is a relatively slow serial interface with a data rate of up to 4 Mb/sec. In contrast, the RX data and TX data interfaces are high speed interfaces where the data rate of signals over these interfaces is as the data rate of the PON (e.g., 1 Gb/sec in a GPON).

In certain PON configurations, a dedicated ONU is connected to the PON to perform maintenance and service availability applications. For example, a dedicated ONU can be utilized as part of a protection mechanism. Other examples include, a dedicated ONU can be utilized to perform optical time-domain reflectometer (OTDR) analysis in the PON, measure RTT values, detect optical faults, and so on. Examples for utilization of dedicated ONUs in the PON can be found in co-pending U.S. patent application Ser. Nos. 12/648,885 and 13/189,935 assigned to common assignee and are hereby incorporated by reference.

Optical faults and their locations in the PON can be detected using optical time-domain reflectometers (OTDRs). The principle of an OTDR includes injecting, at one end of the optical fiber, a series of optical pulses into the optical fiber under test and also extracting from the same end of the fiber, light that is scattered (Rayleigh backscatter) or reflected back from points along the fiber. The strength of the return signals is measured and integrated as a function of time and may be plotted as a function of fiber length. The results may be analyzed to determine the fiber's length, overall attenuation, optical faults, such as breaks, and to measure optical return loss.

The OTDR measurements can be performed in the PON using an out-of-band, an in-band, or a dedicated wavelength technique. Out-of-band testing requires stopping the normal operation of the network and verifying the fiber using external OTDR tools. This can be performed using, for example, wavelengths and test pulses that are separate and independent from and different from other wavelengths used to carry customer service traffic.

The in-band OTDR testing is performed when the network is operational. However, such a testing requires dedicated OTDR testing signals. The OTDR testing signals utilized in conventional in-band OTDR solutions are either AM modulated or FM modulated. However, such signals can be transmitted only during a test period of the PON, during which data signals are not transmitted to the ONUs. Other OTDR solutions utilize a dedicated upstream wavelength for measuring reflection from the fiber.

These OTDR techniques are performed using an external testing device that could be either an OTDR tool or a dedicated optical unit connected in the PON and adapted to perform OTDR measurements.

In conventional solutions, a dedicated ONU is connected through an optical fiber (which may be a dedicated fiber, the PON's fiber, or combination thereof) to the OLT. As a result, the OTDR measurements performed using the dedicated ONU should take into account the delay induced by the optical fiber connecting the OLT to the ONU. The induced delay is typically determined through a ranging process.

In addition, the dedicated ONU should be within a small optical distance from the OLT. However, this is not always the case within systems utilized to detect optical failures. By way of example, the system discussed in the Ser. No. 13/189,935 application, where an OLT is connected to a dedicated ONU (i.e., collocated ONU) through a splitter and a dedicated optical fiber to form an optical link utilized for transmitting signals for the purpose of failure detections.

SUMMARY

Certain embodiments of the invention include an optical line terminal (OLT) operable in a passive optical network (PON) and structured to perform OTDR measurements. The OL T comprises an electrical module for generating continuous downstream signals and processing received upstream burst signals according to a communication protocol of the PON; an optical module for transmitting continuous optical signals over a first wavelength, receiving optical upstream burst signals over a second wavelength, and transmitting optical upstream burst signals over the third wavelength, wherein the optical module further includes an optical network unit (ONU) traffic processing module being electrically coupled to the optical module and the electrical module, wherein the ONU traffic processing module is configured to emulate one of a plurality of optical network units (ONUs) of the PON, to generate an analysis pattern to be transmitted as the optical upstream burst signals over the third wavelength, and analyze an analysis pattern received in the optical upstream burst signals over the second wavelength for the purpose of performing the OTDR measurements; and an interface for interfacing between the electrical module and the optical module.

Certain embodiments of the invention also include an optical line terminal (OLT) operable in a passive optical network (PON) and structured to perform in-band OTDR measurements. The OL T comprises an electrical module for generating continuous downstream signals and processing received upstream burst signals according to a communication protocol of the PON; an optical module for transmitting continuous optical signals over a first wavelength, receiving optical upstream burst signals over a second wavelength, and transmitting optical upstream burst signals over the second wavelength, wherein the optical module further includes an optical network unit (ONU) traffic processing module being electrically coupled to the optical module and the electrical module, wherein the ONU traffic processing module is configured to emulate one of a plurality of optical network units (ONUs) of the PON, generate an analysis pattern to be transmitted as the optical upstream burst signals over the second wavelength, and analyze an analysis pattern received in the optical upstream burst signals for the purpose of performing OTDR measurements, the first and second wavelengths are wavelengths defined in the communication standard of the PON; and an interface for interfacing between the electrical module and the optical module.

Certain embodiments of the invention also include an optical line terminal (OLT) operable in a passive optical network (PON) and structured to perform in-band OTDR measurements. The OL T comprises an electrical module for generating continuous downstream signal and processing received upstream burst signals according to a communication protocol of the PON; an optical module for transmitting continuous optical signals over a first wavelength, receiving optical upstream burst signals over a second wavelength, and transmitting optical upstream burst signals over the second wavelength, wherein the optical module further includes an optical network unit (ONU) traffic processing module being electrically coupled to the optical module and the electrical module, wherein the ONU traffic processing module is configured to emulate one of a plurality of optical network units (ONUs) of the PON, generate an analysis pattern analysis to be transmitted as the optical upstream burst signals over the second wavelength, and analyze an analysis pattern received in the optical upstream burst signals for the purpose of performing OTDR measurements, the first and second wavelengths are wavelengths defined in the communication standard of the PON; and an interface for interfacing between the electrical module and the optical module.

BRIEF DESCRIPTION OF THE DRAWINGS

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

DETAILED DESCRIPTION

Figure 1:
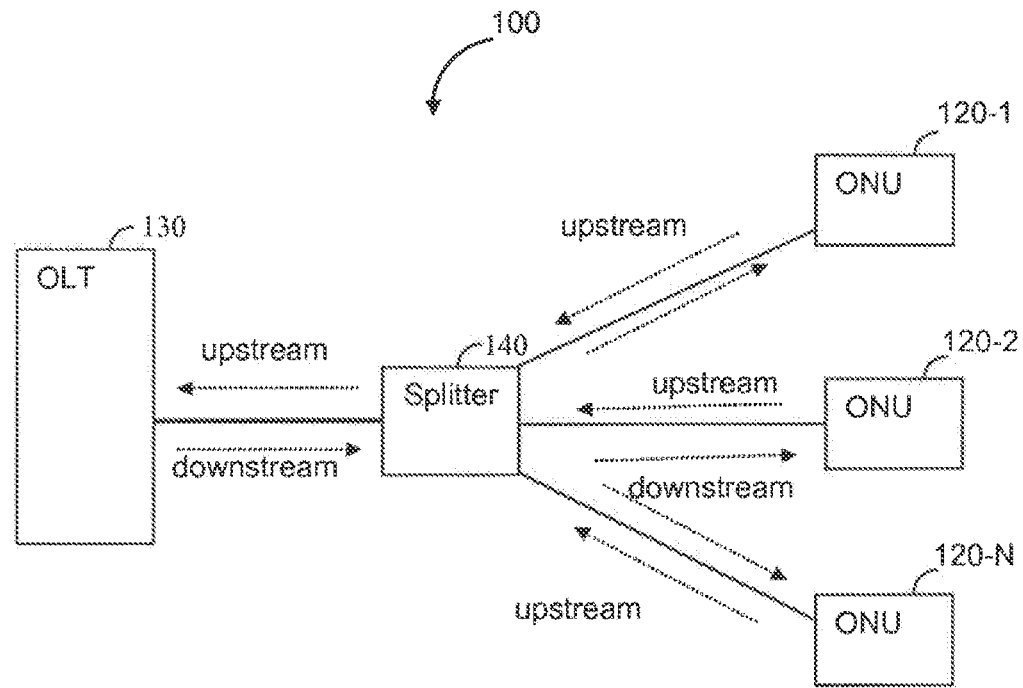
FIG. 1 is a schematic diagram of a PON.

It is important to note that the embodiments disclosed are only examples of the many advantageous uses of the innovative teachings herein. In general, statements made in the specification of the present disclosure do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 3A:
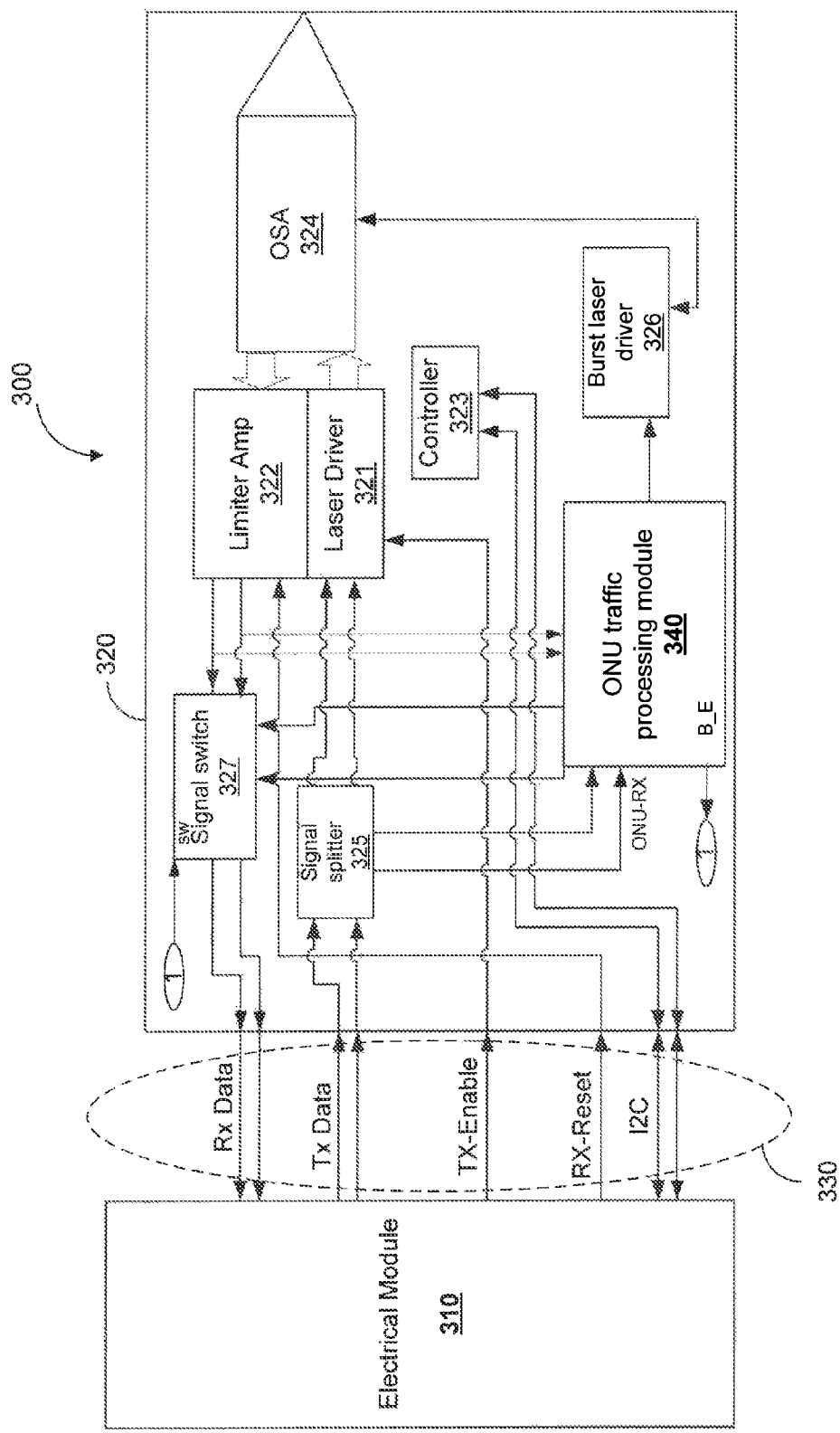
FIG. 3A is a block diagram of an OLT designed to perform ONU functionality and in-band OTDR measurements according to one embodiment.

FIG. 3 shows an exemplary and non-limiting diagram of an optical line terminal (OLT) 300 constructed according to one embodiment. The OLT 300 includes an electrical module 310 and an optical module 320 connected to each other through a standard interface 330.

The interface 330 provides connectivity for transmitted (TX) signals, received (RX) signals, a TX-Enabled signal for enabling transmission to the ONUs, a RX-reset signal for resetting a reception of a current burst signal, and control (I2C) signals. As noted above, the interface 330 provides a standard connectivity compatible with different types SFP or other standard transceivers operable in an OLT.

The electrical module 310 processes the received upstream signals and generates downstream signals. The electrical module 310 typically includes a network processor and PON MAC adapter designed to process and handle upstream and downstream signals according to a respective PON standard. In an embodiment, the electrical module 310 handles PON upstream and downstream traffic compliant with at least any of the EPON, 10G-EPON, GPON, and XG-PON. In a downstream direction, a continuous signal is sent, for example, in a form of GEM frames in a GPON or XGEM frames in XG-PON, to all ONUs connected to the PON. Each ONU filters its respective data according to pre-assigned labels (e.g., GEM port-IDs in a GPON). The electrical module 310 allocates for each ONU a time slot in which the ONU can send data to the OLT. The reception of data, in the upstream direction, is of burst signals sent from the ONUs.

The optical module 320 receives upstream optical burst signals sent from ONUs and transmits a downstream continuous optical signal to ONUs. The reception and transmission of these downstream/upstream signals is over two different wave lengths. For example, in a GPON, in the downstream direction, the optical module 320 generates an optical signal of a 15XY wavelength and in the upstream direction receives optical signals of a 13XY wavelength.

Figure 2:
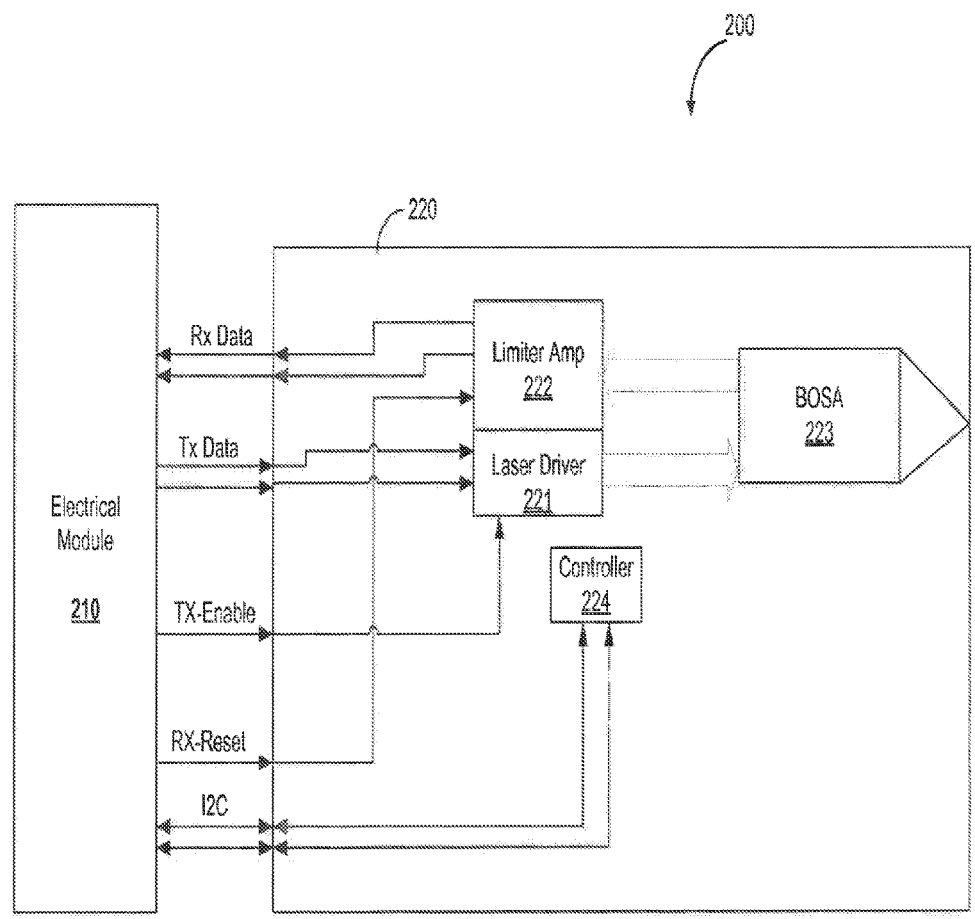
FIG. 2 is a block diagram of a conventional OLT.

The optical module 320 includes a laser driver diode 321 and a limiter amplifier (Amp) driver 322 respectively coupled to a transmit laser diode and a receive photodiode. The functionality of the laser driver 321 and amplifier 322 are described above according to FIG. 2. The controller 323 communicates with the electrical module 310 through the I2C interface and performs tasks related to calibration and monitoring of the transceiver.

Figure 8:
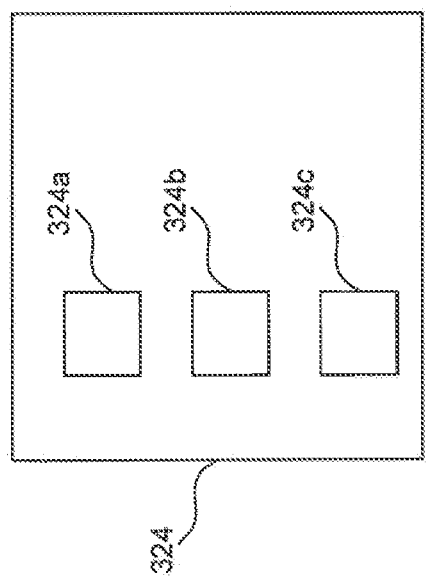
FIG. 8 is a block diagram of as illustrative optical subassembly according to one embodiment.

According to an embodiment, the transmit and receive optical elements coupled to the laser driver diode 321 and limiter amplifier 322 are part of an optical sub-assembly (OSA) module 324. In one embodiment, the OSA module 324 is a triplexer. According to this embodiment, the OSA module 324 includes, in addition to a pair of transmit/receive photodiodes, a transmit photodiode, hereinafter the "ONU-TX-photodiode" utilized for transmitting burst optical signals at a wavelength utilized by the ONUs in the PON downstream. As a non-limiting example shown in FIG. 8, the OSA module 324 includes a transmit laser diode 324a transmitting signals at a wavelength of 15XY, a receive photodiode 324b for receiving option signals at a wavelength of 13XY, and the ONU-TX-photodiode 324c for transmitting signals at a wavelength of 13XY. The ONU-TX-photodiode is driven by a burst laser driver shown in FIG. 3. The burst laser driver 326 produces two current signals: bias and modulation. The bias current determines the optical power of '0' level and the modulation current determines the optical power of '1' level of a burst signal generated the ONU traffic processing module 340.

Figure 9:
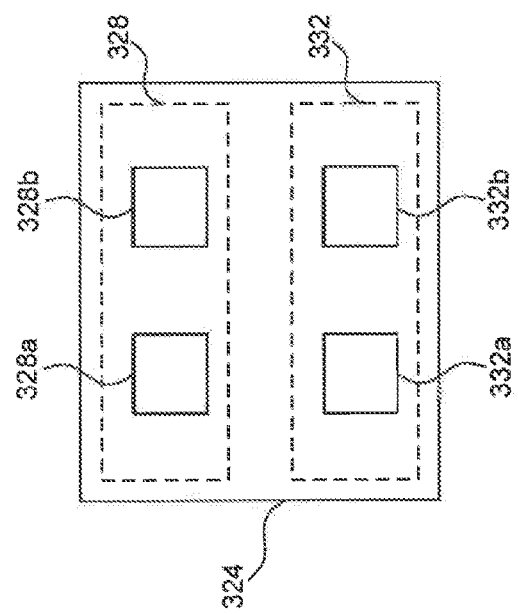
FIG. 9 is a block diagram of an alternate optical sub-assembly according to one embodiment.

According to another embodiment shown in FIG. 9, the OSA module 324 is quad-plexer that includes four optical elements, two laser diodes 328a, 332a and two photodiodes 328b, 332b. A first pair of transmit/receive optical element 328, that operate at a wavelength of the OLT (an example provided above) and a second pair of transmit/receive optical element 332 is utilized to transmit/receive signals by the ONU traffic processing module 340. The wavelength of the second pair of transmit/receive optical elements may be as defined for upstream communications by the ONUs in the PON or dedicated wavelength not defined by the respective PON communication standard. A pair transmit/receive optical element includes a laser diode and a photodiode respectively.

According to various embodiments disclosed herein, integrated in the optical module 320 of the OLT 300 is the ONU traffic processing module 340, coupled to a signal splitter 335 for receiving signals to be transmitted to the PON. The ONU traffic processing module 340 is further connected to an output of the limiter amplifier 322 to provide duplicated samples of the received burst signals to the module 340. In an embodiment, the module 340 may be also connected to a signal switching unit 327 to transmit burst signals directly to the OLT electric module 310 and through the PON. The selection of the RX data for the electric module 310 is from the PON or the module 340 is based on a burst-enabled signal asserted by the ONU traffic processing module 340.

The ONU traffic processing module 340 is configured as any other ONU in the PON. That is, the ONU traffic processing module 340 is assigned with a unique ONU-ID to which the downstream traffic can be directed. Furthermore, the OLT's 300, by means of the electric module 310, can allocate a time slot to the ONU traffic processing module 340 for transmission of upstream data.

The ONU traffic processing module 340 is electrically connected to the OLT 300. Thus, data transmitted by the OLT 300 is not received at the module 340 through the optical fiber of the PON, but rather through the signal splitter 325. Thus, the optical distance between the ONU traffic processing module 340 and the OLT 300 is effectively zero, as such a distance is determined by the electrical path between the modules 310 and 340.

The ONU traffic processing module 340 includes a packet processor and a PON MAC adapter (both are not shown). The packet processor typically performs PON processing tasks, such as filtering, forwarding-and-learning, flow classification, packets classification, queuing and shaping of packets, reassembling of packets, and so on.

As the module 340 is not connected to a subscriber device, the packet processor processes only a downstream flow, i.e., data sent from an OLT. In an embodiment, the data processor of the module 340 is configured to generate a set of predefined data patterns that can be sent to the PON through the OSA module 324, and eventually may be received by the OLT 300. Such generated and transmitted data patterns are utilized for various maintenance and service availability applications, including, but not limited to, PON protection, detection of optical failures using OTDR measurements, RTT measurements, and so on. In other embodiments, the module 340 can be configured to respond with data packet to a communication from the OLT.

The PON MAC adapter included in the ONU traffic processing module 340 processes downstream traffic flows in accordance with the type of PON network. In an embodiment, the PON MAC adapter of the module 340 processes GPON or XG-PON traffic. In this configuration, the PON MAC adapter supports a plurality of traffic containers (T-CONTs). A T-CONT is a virtual upstream channel to which bandwidth is granted by the OLT's electrical module 310. A single T-CONT can be allocated for an ONU, a class of service (CoS), or a logical ONU. The PON MAC adapter maintains T-CONT queues as the number of T-CONTs and cyclically requests for packets in order to fill a specific T-CONT queue.

The ONU traffic processing module 340 included in the optical module 320 serves as a dedicated ONU. However, in contrast to conventional solutions, the optical ONU traffic processing module 340 is electrically connected to the OLT 300 and not through an optical fiber. Thus, there is no need to use optical filters and establish dedicated optical links, thus the modified OLT 300, simplifies the topology of the PON when such a dedicated ONU is required. The modified OLT 300 further simplifies the processing of various maintenance and service availability applications that can be performed using the dedicated ONU, i.e., ONU traffic processing module 340.

The ONU traffic processing module 340 can be implemented as an integrated circuit (IC), application-specific integrated circuit (ASIC), or a field-programmable gate array (FPGA) integrated in the optical module 320. In an exemplary embodiment, the ONU traffic processing module 340 can be realized as the enhanced PON processor described in U.S. Pat. No. 7,643,753 or as the PON processor with a programmable data path described in a co-pending U.S. patent application Ser. No. 12/821,931, both are assigned in common to the same assignee as the present application, and are hereby incorporated for all that they contain. According to an exemplary embodiment, the microprocessor and/or the network processor can be adapted to perform the maintenance and service availability applications when a dedicated. ONU is utilized.

It should be noted that the integration of the ONU traffic processing module 340 in the OLT optical module 320 provides a standardized fast communication channel to the optical module 320, without changing the standard interface 330. This communication channel is realized by sending downstream data to the module 340 and receiving responses generated by the module 340 through the PON or through the signal switching unit 327. The communication channel complies with the PON communication standard. As mentioned above, on this communication channel, signals utilized in the processes related to testing the performance of the PON and the OLT, detection of optical failures, RTT measurements, OTDR measurements, and the like can be transported. Again, all such processes and their signals are transmitted by using the standard communication protocol of the PON.

According to an embodiment of the invention, the modified OLT 300 can be utilized for performing in-band and out-of-band OTDR measurements. The in-band OTDR is performed by signals generated by the ONU traffic processing module 340 and transmitted over a wavelength utilized by other ONUs in the PON. The reflected signals are received back at the OLT 300 and proceed by the module 340.

Figure 3B:
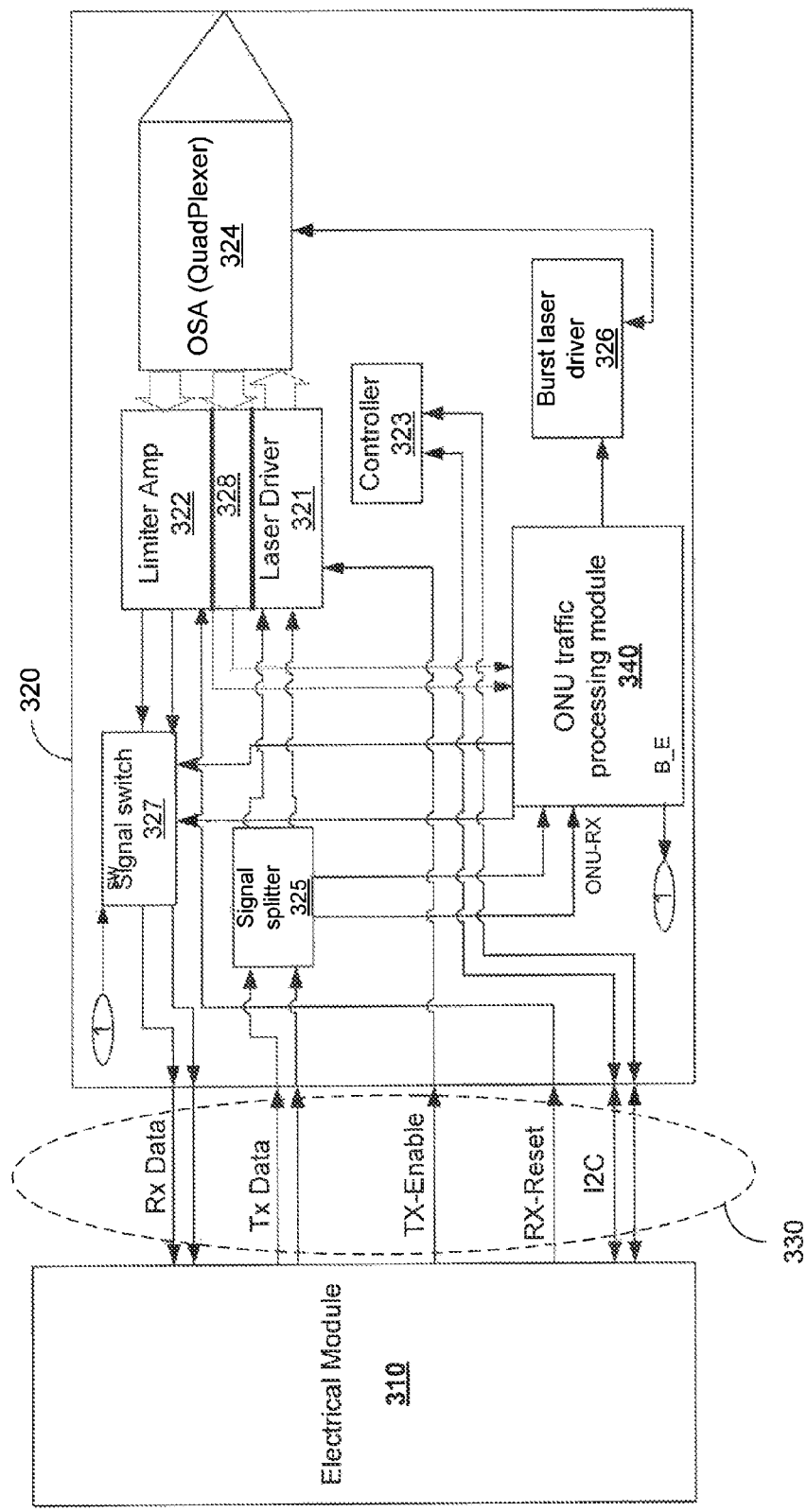
FIG. 3B is a block diagram of an OLT designed to perform ONU functionality and out-of-band OTDR measurements according to one embodiment.

In another embodiment, illustrated in FIG. 3B, the OLT 300 is in its quad-plexer configuration, i.e., the OSA module is a quad-plexer. The configuration is utilized to perform the out-of-band OTDR utilized to generate analysis signals that are transmitted over a dedicated wavelength. The reflected signals are received through a continuous receiver 328 at the ONU traffic processing module 340 also over the dedicated wavelength for the purpose of performing OTDR measurements. According to the embodiments disclosed herein, in both the in-band and out-of-band OTDR techniques, OTDR measurements can be performed without halting the operation of the PON.

Figure 4:
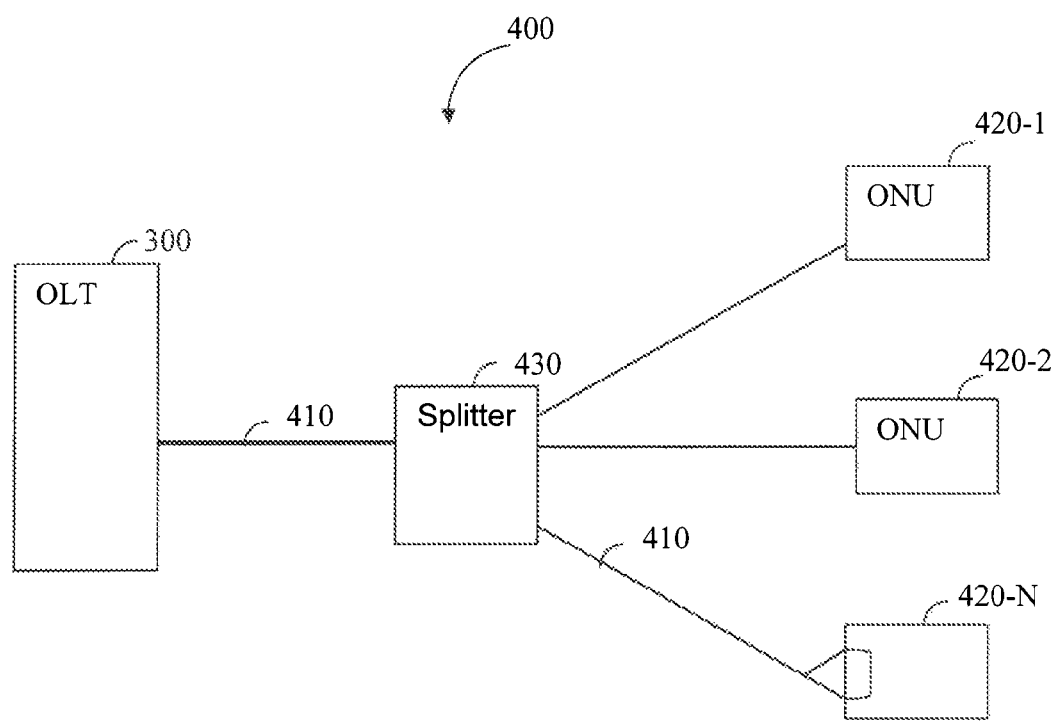
FIG. 4 is a schematic diagram of a PON utilized to describe various embodiments of the invention.

The carry out the OTDR techniques the OLT 300 is connected in a PON 400 shown in FIG. 4. It should be noted that the OLT 300 serves as the OLT of the PON 400. The OLT 300 may be realized as discussed with respect to FIGS. 3A and 3B. That is, the OLT 300 performs all tasks defined by the respective communication protocol of the PON. Such tasks include at least allocating time slots for transmission data by the ONUs 420-1 through 420-N, receiving and processing upstream burst data from the ONUs 420-1 through 420-N, and generating and transmitting downstream data to the ONUs. In addition, the OLT 300 controls the ONU traffic processing module 340 as described detailed above. The OTDR measurements can be utilized to detect faults in any location in the optical path (e.g., the optical path 410) between the OLT 300 and each of the ONUs 420-1 through 420-N through the splitter 430. The detected faults may include at least a damaged optical fiber, a bend in an optical fiber, a bad splice, dirty connectors, a fiber cut, and so on.

Figure 5:
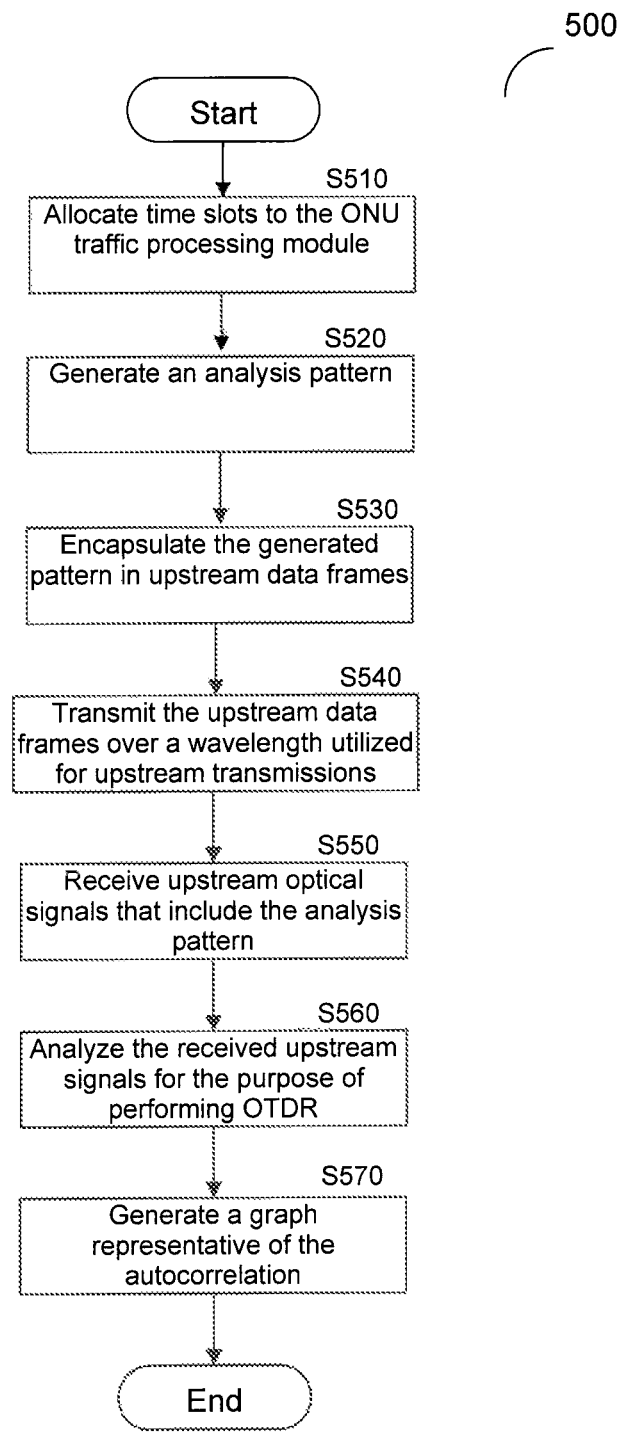
FIG. 5 is a flowchart illustrating a method for performing in-band OTDR using the OLT illustrated in FIG. 3 according to one embodiment.

FIG. 5 is a non-limiting and exemplary flowchart 500 illustrating the method for performing in-band OTDR using the OLT 300 according to an embodiment of the invention. At S510, one or more time slots are allocated to transmission of an analysis pattern by the by ONU traffic processing module 340.

At S520, the analysis pattern is generated by the ONU traffic processing module 340. According to one embodiment, the analysis pattern is a low rate data pattern that includes high frequency components. The analysis pattern satisfies the communication requirements of the PON but at the same time, can be analyzed to identify faults' and their locations in the optical paths mentioned above. For example, if the PON in which the OLT 300 is installed, the analysis pattern maintains the GPON's consecutive identical digits (CID) requirements of, e.g., CID<72 bits and the transmission rate of such pattern is as the allowable upstream data-rate in a GPON.

In an exemplary embodiment, the creation of the analysis pattern includes generating a data pattern using a low rate polynomial, applying a full rate repeating bits function on the data pattern to generate a first bit sequence, performing a first bit-wise-xor operation between the first bit sequence and a second bit sequence generated by a scrambler polynomial to generate an analysis bit sequence, and performing a second bit-wise-xor operation between the analysis bit and a third bit sequence generated by the scrambler polynomial to produce the analysis pattern. A detailed discussion for generating the analysis pattern can be found in the co-pending application Ser. No. 13/189,935 referenced above.

At S530, the generated analysis pattern in encapsulated in data frames transmitted in the upstream direction from the ONU module 340 to the OLT 300. For example, in a GPON, the generated analysis pattern can be included in one or more upstream GEM frames.

At S540, the upstream data frames are transmitted through the OSA module 324 to the fiber 410. The upstream data frames are sent as optical burst signals over a wavelength utilized for upstream transmission by the other ONUs (e.g., ONUs 420-1 through 420-N) of the PON. For example, in a GPON, the wavelength being utilized is 13XY.

At S550, the upstream optical signals (carrying in part the analysis feedback) are received in the OLT 300 at the receive photodiode in the OSA module 324 over a wavelength utilized for upstream communications by the ONUs. The received optical signals are either reflected from the fiber 410 or looped back at the end of the fiber 410. The received upstream signals at the output of the limiter amplifier 322 are also input to the ONU traffic processing module 340.

At S560, the ONU traffic processing module 340 analyzes the received upstream signals for the purpose of performing OTDR measurements, which can be used to detect faults in the optical path between the OLT 300 and the ONUs 420, and the exact locations of such faults. The location of a fault can be identified at any point on the fiber 410 (e.g., 120 meters from OLT 300) and at any location of the optical elements in the path, e.g., optical connectors, splitters, and so on.

It should be noted that the traffic processing module 340 may receive upstream burst signals sent by all ONUs 420-1 through 420-N. However, for the purpose of the OTDR measurements only received signals that carry the analysis pattern are analyzed.

According to an exemplary embodiment, the analysis is performed using a time shift auto-correction function between a received signal that includes the analysis pattern and a copy of the generated analysis pattern. The analysis is repeated for N required bit-shifts. The number of bit shifts N represents the distance from the OTDR that the signal is being analyzed, where the signals are shifted one relative to the other representing all possible measured delays of the PON. The parameter N is a configurable parameter that can determine the resolution of the OTDR measurements. To provide a higher resolution, the generated analysis pattern should be transmitter at a higher pattern rate.

As a non-limiting example, the auto-correlation process utilized during the signal analysis may be defined as follows:

AutoCorrelation($Ti$){analog amount}=sum of((RX_AP bit-wise-xor(analog GEN_AP($Ti$))) with quantization of $n$ bits, where $n>1$ where, RX_AP is the received analysis pattern and the GEN_AP is the generated analysis pattern. The AutoCorrelation is a vector having a length of the optical length. Each element of the vector is the value of the correlation amount between the transmitted pattern and the received pattern with the relevant bit delay that represent the distance measured. The value of the AutoCorrelation ($Ti$) can be indicative of the conditions of the optical path at point $C*Ti/2$ (C is the speed of light in the fiber).

The measured autocorrelation at any $Ti$ represents the reflected power from a location in the optical path respective of the $i^{th}$ shifted bit. According to one embodiment, the value of the AutoCorrelation function at time $Ti$ may be compared to a value that indicates normal or acceptable behavior at a location on the optical path (respective of time $Ti$), and any deviation is a fault indication. It should be noted that the measured correlation represent values (i.e., reflected power) that are above or below the norm represent different faults in the optical path. For example, higher reflected power values may be indicative of a broken/damaged fiber, while reflection values lower than the norm are indicative of attenuations in the fiber, due to for example, bends, bad splices, direct connectors or a fiber cut.

At S570, a graph representative of the autocorrelation results is generated. The autocorrelation function results represent the OTDR measurements. Any abnormal results in the auto-correlation graph are noticeable on the graph (e.g., as blips) and are indicative of faults in the optical path. The abnormal results may be a function of noise, changes in the rates and frequency of the correlated graph.

As the analysis is performed by the ONU traffic processing module 340 which is responsible for sending the analysis patterns and receiving such patterns as reflected by the PON, there is no need to perform any ranging process as part of the OTDR process. Thus, the disclosed embodiments simplify the execution of in-band OTDR measurements in PONs. It should be noted that the OLT 300 can perform a ranging processing when it is required. However, for OTDR measurements according to the teaching disclosed herein, a ranging process is not required.

In the embodiment described above, the analysis of the received patterns for the purpose of the performing OTDR measurements (i.e., S570 and S580) is performed by the ONU traffic processing module 340. In another embodiment, such analysis can be performed using the electrical module 310 of the OLT 300 or calculation processor configured to perform time shift correction. According to the embodiment, the generated analysis pattern is provided by the module 340 through the signal switching unit 327. This analysis pattern is later autocorrected with received burst signals that include the pattern analysis (generated and sent by the module 340 through the OSA 324). The autocorrelation can be performed as described above.

It should be noted that as the optical distance between the ONU traffic processing module 340 and the electrical module 310 is practically zero, there is no optical delay that should be determined or considered when performing the OTDR measurements.

Figure 6:
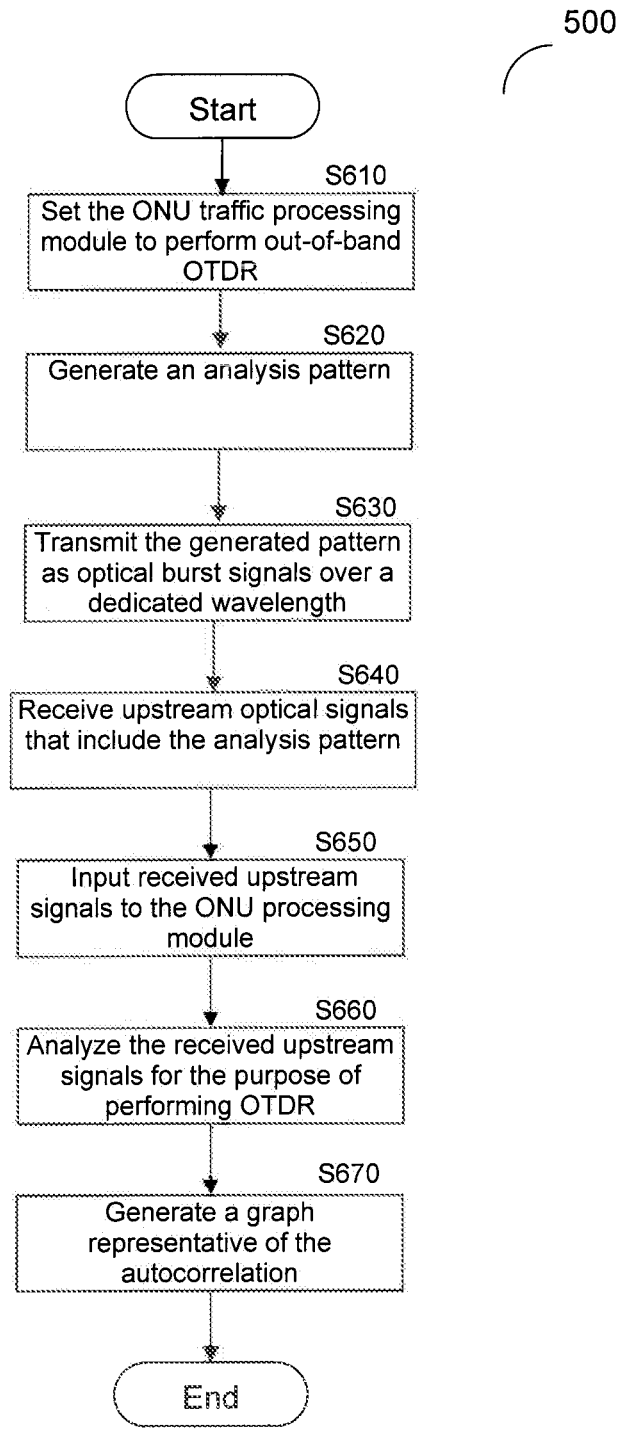
FIG. 6 is a flowchart illustrating a method for performing out-of-band OTDR using the OLT illustrated in FIG. 3 according to one embodiment.

FIG. 6 is a non-limiting and exemplary flowchart 600 illustrating a method for performing out-of-band OTDR measurements using the OLT 300 according to an embodiment of the invention. According to this embodiment, the OSA 324 is quad-plexer, as shown in the exemplary FIG. 3, that supports an additional wavelength (hereinafter a dedicated wavelength) that is not defined in the respective communication protocol standard of the PON. For example, the dedicated wavelength in a PON will not be selected to be in the range of 13XY and 15XY. The value of the dedicated wavelength may be a function of the cost to manufacture the OSA 324. To support the dedicated wavelength the OSA 324 includes a layer diode to transmit the optical signals and photodiode to receive the signals modulated over the dedicated wavelength. In additional, the optical module 320 includes a continuous receiver 328.

At S610, the ONU traffic processing module 340 is set to perform out-of-band OTDR measurements. The module 340 can be also configured when to perform the OTDR. This can be done on-demand or at a predefined time interval. These setting can be done by the PON operator. At S620, the analysis pattern is generated by the ONU traffic processing module 340. As mentioned above, the analysis pattern is a low rate data pattern. It should be noted that in the case of the out-of-band OTDR there is no requirement for high frequency components, as a dedicated receiver and transmitter are used to receive/transmit signals at the dedicated wavelength.

At S630, the generated analysis pattern is transmitted as upstream optical burst signals over the dedicated wavelength through the OSA module 324 to the fiber 410. At S640, the upstream burst optical signals (carrying in part the analysis pattern) are received in the OLT 300 at the receive photodiode in the OSA module 324 associated with the dedicated wavelength. The received optical signals are either reflected from the fiber 410. At S650, the received upstream signals at the output of the continuous receiver 328 are also input to the ONU traffic processing module 340. In addition, the signals received over the dedicated wavelength are locally analyzed by the ONU traffic processing module 340.

At S660, the ONU traffic processing module 340 analyzes the received upstream burst signals for the purpose of performing OTDR measurements. As noted such measurements can be used to detect faults in the optical path between the OLT 300 and the ONUs 420, and the exact locations of such faults. The analysis is performed as described in detail above.

At S670, a graph representative of the autocorrelation function results is generated. The autocorrelation function results represent the OTDR measurements. Any non-auto correlated results are noticeable on the graph (e.g., as blips) and are indicative of faults in the optical path.

It should be noted that the network operator can configure the ONU traffic processing module 340 with regard to the mode of operation for performing the OTDR measurements.

The in-band and out-of-band OTDR measurements disclosed herein can be based on the autocorrelation results of the two generated analysis pattern and the received (reflected) analysis pattern. The faults may be identified by generating a graph that represents the autocorrelation results. An example is illustrated in FIGS. 7A and 7B.

Figure 7A:
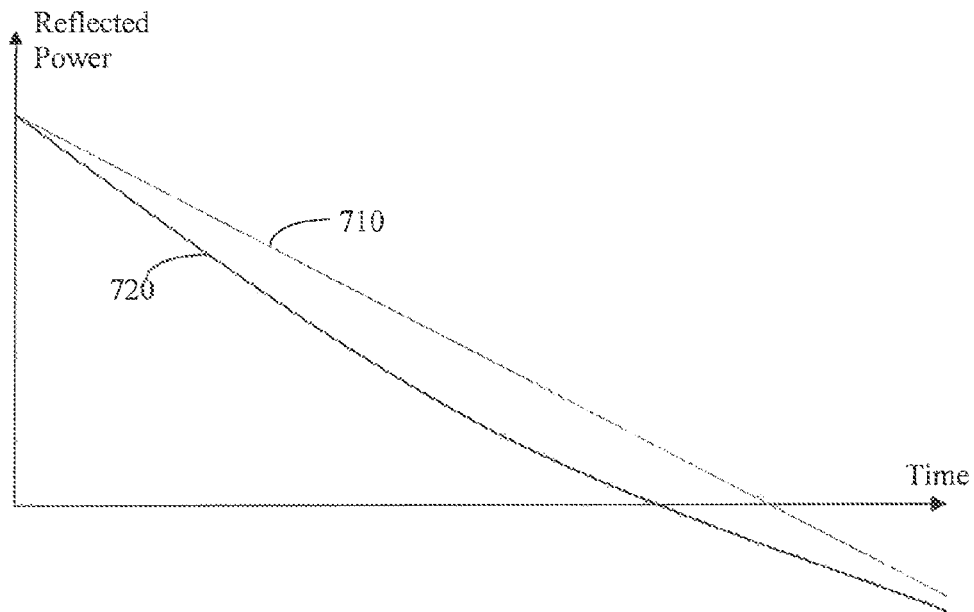
FIGS. 7A and 7B show graphs of the power of retuned signal over time as generated using an embodiment of the invention.
Figure 7B:
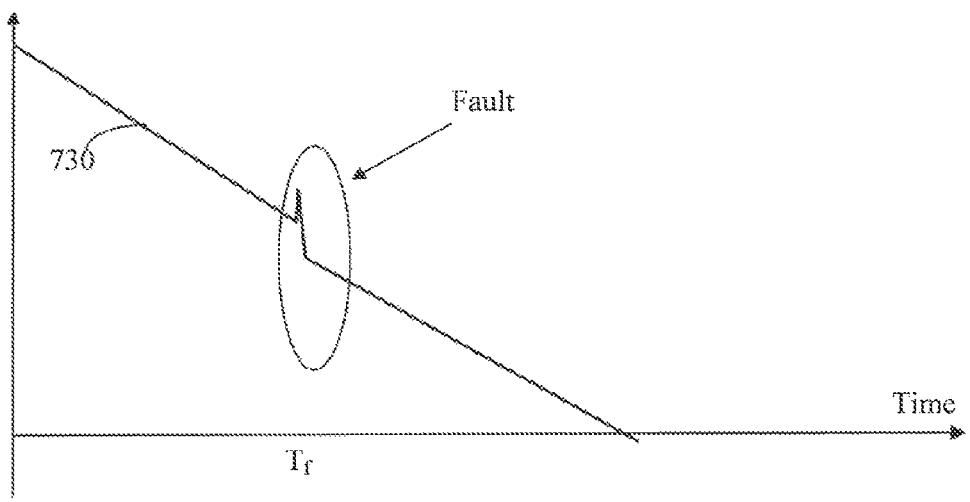

FIG. 7A shows graphs 710 and 720 that are examples for possible normal autocorrelation of the received and generated analysis patterns. FIG. 7B depicts a graph 730 showing a blip at time Tf. This indicates a fault in the optical path that may be a result of, for example, a bad connector that returns some of the power. The location of the fault is at $(C*T_f)/2$, f=0, 1, ... N−1. Examples for other faults that can be detected include a cat fiber, a flattened fiber, bends in the fiber, dirty connections, and so on.

The various embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An optical line terminal (OLT), comprising:
   an electrical module configured to generate downstream signals and to process received upstream signals according to a communication protocol of passive optical network (PON);
   an optical module configured to transmit optical signals over a first wavelength, to receive optical upstream signals over a second wavelength, and to transmit optical upstream signals over a third wavelength,
   wherein the optical module further comprises an optical network unit (ONU) traffic processing module, wherein the ONU traffic processing module is configured to perform as an ONU unit of the PON, to generate a first analysis pattern to be transmitted as the optical upstream signals over the third wavelength, and to analyze a second analysis pattern received in the optical upstream signals over the second wavelength to perform optical time-domain reflectometer (OTDR) measurements; and
   an interface configured to interface between the electrical module and the optical module.

2. The OLT of claim 1, wherein the optical module further comprises:
   an optical sub assembly module that comprises a first laser diode operable at the first wavelength, a first photodiode operable at the second wavelength, and a second laser diode operable at the third wavelength, wherein the first and the second wavelengths are defined in the communication protocol of the PON;
   a laser driver coupled to the first laser diode;
   a limiter amplifier coupled to the first photodiode;
   a burst laser driver coupled to the second laser diode;
   a controller coupled to I2C lines of the interface;
   a signal switching unit coupled to the limiter amplifier and to be enabled by the ONU traffic processing module to relay received upstream signals to the electric module; and
   a signal splitter coupled to transmit data lines of the interface and to provide duplicated signals of the downstream signals generated by the electrical module to the ONU traffic processing module.

3. The OLT of claim 1, wherein the ONU traffic processing module is coupled to an output of the limiter amplifier to receive duplicated signals respective of the received upstream signals.

4. The OLT of claim 1, wherein the generated first analysis pattern is a low rate data pattern that comprises high frequency components.

5. The OLT of claim 1, wherein the OTDR measurements are in-band OTDR measurements.

6. The OLT of claim 5, wherein the ONU traffic processing module is further configured to:
   encapsulate the generated first analysis pattern in upstream data frames complying with the communication protocol of the PON, wherein the upstream data frames are transmitted as the optical upstream signals over the third wavelength;
   receive upstream data frames comprising the second analysis pattern, wherein the upstream data frames are included in the received optical upstream signals over the second wavelength; and auto-correlate the generated first analysis pattern with the received second analysis pattern, wherein the auto-correlation results represent the in-band OTDR measurements.

7. The OLT of claim 6, wherein abnormal events respective of the auto correlation results are indicative of a fault in an optical path of the PON and occurrence times of such events are indicative of the fault's location in the optical path.

8. The OLT of claim 6, wherein the second wavelength equals to the third wavelength which is a wavelength utilized by the plurality of ONUs for upstream communication.

9. The OLT of claim 6, wherein the received second analysis pattern represents reflections from an optical path of the PON, and the optical path comprises a fiber and optical elements in the PON.

10. The OLT of claim 1, wherein the OTDR measurements are out-of-band OTDR measurements.

11. The OLT of claim 10, wherein the optical module further comprises a second photodiode configured to receive the upstream optical signals over the third wavelength, wherein the third wavelength is a dedicated wavelength not defined by the communication protocol of the PON.

12. The OLT of claim 11, wherein the ONU traffic processing module is further configured to:
encapsulate the generated first analysis pattern in upstream data frames wherein the upstream data frames are transmitted as the optical upstream signals over the third wavelength;
receive upstream data frames comprising the second analysis pattern, wherein the upstream data frames are included in the received optical upstream signals over the third wavelength; and
auto-correlate the generated first analysis pattern with the received second analysis pattern, wherein the auto-correlation results represent the out-of-band OTDR measurements.

13. The OLT of claim 12, wherein the upstream signals over the third wavelength are any one of continuous optical signals or burst optical signals.

14. The OLT of claim 12, wherein the ONU traffic processing module is further configured to:
produce a graph including the auto-correlation results; and
compare the produced graph to a graph indicating a normal behavior of an optical path of the PON to detect faults in the optical path.

15. The OLT of claim 14, wherein a detected fault comprises at least one of: a damaged optical fiber, a bend in an optical fiber, a had splice, dirty connectors, or a fiber cut.

16. The our of claim 1, wherein the electrical module is configured to allocate upstream time slots for transmission of upstream bst signals by the ONU traffic processing module.

17. The OLT of claim 1, wherein the interface is a small form-factor pluggable (SFP) interface.

18. The OLT of claim 17, wherein the PON is at any one of: an Ethernet PON (EPON), a ten Gigabit-Ethernet PON (10G-EPON), a Gigabit PON (GPON), or a ten Gigabit PON (XG-PON).

19. An optical line terminal (OLT) for performing in-band optical time-domain reflectometer (OTDR) measurements, comprising:
an electrical module configured to generate downstream signals and to process received upstream signals according to a communication protocol of a passive optical network (PON);
an optical module configured to transmit optical signals over a first wavelength, to receive optical upstream signals over a second wavelength, and to transmit optical upstream signals over the second wavelength,
wherein the optical module further comprises an optical network unit (ONU) traffic processing module, wherein the ONU traffic processing module is configured to perform as an ONU of the PON, to generate a first analysis pattern to be transmitted as the optical upstream signals over the second wavelength, and to analyze a second analysis pattern received in the optical upstream burst signals to perform OTDR measurements, and wherein the first and the second wavelengths are wavelengths defined in the communication standard of the PON; and
an interface configured to interface between the electrical module and the optical module.

20. The OLT of claim 19, wherein the ONU traffic processing module is further configured to:
encapsulate the generated first analysis pattern in upstream data frames being compliant with the communication protocol of the PON, wherein the upstream data frames are transmitted as the optical upstream signals over the second wavelength;
receive upstream data frames comprising the second analysis pattern, wherein the upstream data frames are included in the received optical upstream signals over the second wavelength; and
auto-correlate the generated first analysis pattern with the received second analysis pattern, wherein the auto-correlation results represent the in-band OTDR measurements.

21. An optical line terminal (OLT) for performing out-of-band OTDR measurements, comprising:
an electrical module configured to generate continuous downstream signals and to process received upstream burst signals according to a communication protocol of a passive optical network (PON);
an optical module configured to transmit continuous optical signals over a first wavelength, to receive optical upstream burst signals over a second wavelength, to transmit first analysis optical upstream signals over a third wavelength, and to receive second analysis optical upstream burst signals over the third wavelength,
wherein the optical module further includes an optical network unit (ONU) traffic processing module configured to emulate one of a plurality of optical network units (ONUs) of the PON, to generate a first analysis pattern to be transmitted as the first analysis optical upstream burst signals over the third wavelength, and to analyze a second analysis pattern received in the second analysis optical upstream burst signals to perform the OTDR measurements, wherein the third wavelength is a dedicated wavelength not defined by the communication protocol of the PON; and
an interface configured to interface between the electrical module and the optical module.

22. The OLT of claim 21, wherein the ONU traffic processing module is further configured to:
encapsulate the generated first analysis pattern in upstream data frames wherein the upstream data frames are transmitted as the first analysis optical upstream signals over the third wavelength, wherein the upstream data frames are not in compliance with the communication protocol of the PON, wherein the upstream signals over the third wavelength are any one of continuous optical signals and burst optical signals;
receive upstream data frames that comprises the second analysis pattern, wherein the upstream data frames are included in the received second analysis optical upstream signals over the third wavelength; and auto-correlate the generated first analysis pattern with the received second analysis pattern, wherein the auto-correlation results represent the out-of-band OTDR measurements.

* * * * *

UNITED STATES PATENT AND TRADEMARK OFFICE
CERTIFICATE OF CORRECTION

PATENT NO.        : 8,805,183 B2
APPLICATION NO.   : 13/478970
DATED             : August 12, 2014
INVENTOR(S)       : Amiad Dvir It is certified that error appears in the above-identified patent and that said Letters Patent is hereby corrected as shown below:

In the Claims

Column 13, line 49, Claim 15, please replace "a had splice" with --a bad splice--.

Column 13, line 50, Claim 16, please replace "The our of claim 1," with --The OLT of claim 1,--.

Column 13, line 52, Claim 16, please replace "upstream bst signals" with --upstream signals--.

Column 14, lines 9-10, Claim 19, please replace "upstream burst signals" with --upstream signals--.

Signed and Sealed this
Twenty-eighth Day of October, 2014

Michelle K. Lee
*Deputy Director of the United States Patent and Trademark Office*